United States Patent [19]
Rettig

[11] 3,793,578
[45] Feb. 19, 1974

[54] REGENERATIVE CHOPPER CIRCUITRY

[75] Inventor: Charles E. Rettig, Brookfield, Wis.

[73] Assignee: The Louis Allis Company, Milwaukee, Wis.

[22] Filed: Mar. 13, 1972

[21] Appl. No.: 234,026

Related U.S. Application Data

[63] Continuation-in-part of Ser. Nos. 82,302, Oct. 20, 1970, and Ser. No. 83,922, Oct. 26, 1970.

[52] U.S. Cl............. 321/44, 307/240, 307/321, 318/375, 318/376, 321/49
[51] Int. Cl............ H02m 7/72, H02p 3/14
[58] Field of Search .. 321/8 R, 43, 44, 49; 307/106, 307/107, 240, 321; 318/331, 375, 376; 323/DIG. 1

[56] References Cited
UNITED STATES PATENTS

| 3,157,870 | 11/1964 | Marino et al. | 320/48 |
| 3,211,964 | 10/1965 | Thorne | 317/151 |
| 3,364,413 | 1/1968 | Abraham | 321/44 X |
| 3,344,331 | 9/1967 | Adler et al. | 307/240 X |

FOREIGN PATENTS OR APPLICATIONS

| 20,138 | 8/1969 | Japan | 321/45 R |

Primary Examiner—William H. Beha, Jr.

[57] ABSTRACT

A chopper for converting fixed magnitude direct current voltage to adjustable magnitude direct current voltage is capable of regenerative operation. Two series connected current control device and diode pairs are connected between adjustable DC voltage output conductors. The fixed magnitude DC voltage input conductors are connected intermediate the elements of each pair. Control circuitry is connected to the current control devices for controlling the magnitude of the output voltage and for effecting power supplying or regenerative operation.

3 Claims, 8 Drawing Figures

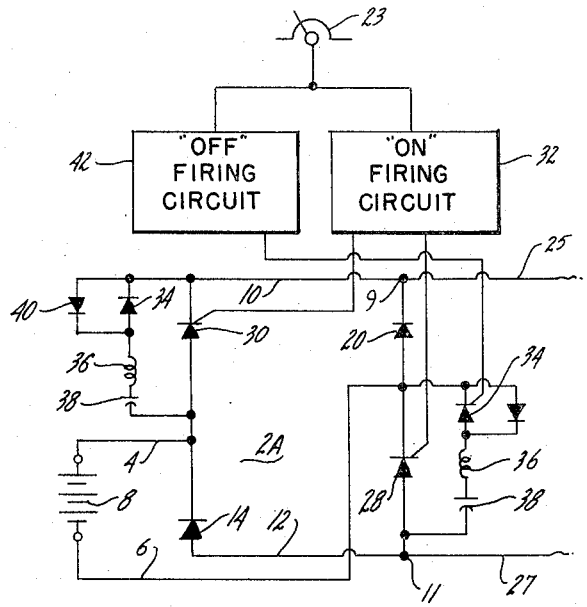
FIG_6
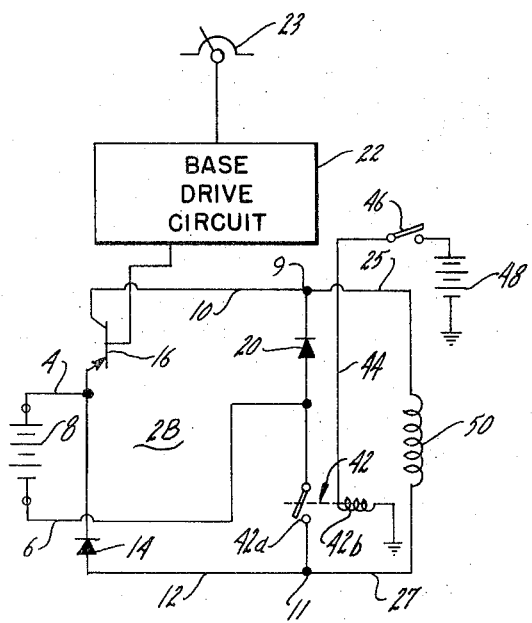
FIG_7A
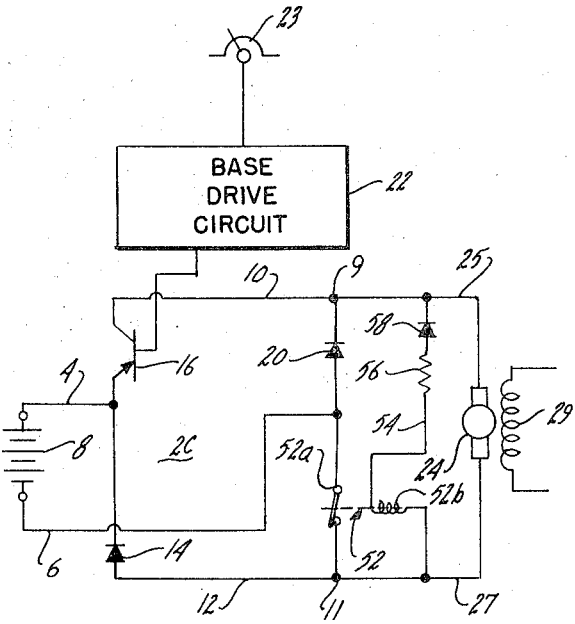
FIG_7B

REGENERATIVE CHOPPER CIRCUITRY

CROSS REFERENCE TO RELATED APPLICATION

The present application is a continuation-in-part application of earlier filed U.S. Pat. applications Ser. No. 82,302 filed Oct. 20, 1970 and Ser. No. 83,922 filed Oct. 26, 1970.

BACKGROUND OF THE INVENTION — FIELD OF THE INVENTION

The present invention relates to circuitry for converting constant magnitude direct current voltage to adjustable magnitude direct current voltage. Such circuits are often termed "choppers."

BACKGROUND OF THE INVENTION — DESCRIPTION OF THE PRIOR ART

It is often necessary, or desirable, to convert a constant magnitude direct current voltage, as for example, that supplied by a battery or by DC supply mains, to an adjustable magnitude direct current voltage for supply to a direct current load, such as a motor. While this may be accomplished by resistive means, such devices are very inefficient because of their electrical losses.

A more efficient means of providing adjustable magnitude direct current voltage from fixed magnitude direct current voltage is through the use of electronic circuitry, commonly termed a chopper. As its name implies, a chopper provides the adjustable magnitude direct current voltage by repetitively applying the constant magnitude direct current voltage for adjustable time intervals, so that over a long period, the average value of the direct current is at the desired adjustable level.

When a chopper is used with an active load, such as a direct current motor, or with a load possessing considerable inductance, regenerative operation is often desired. In regenerative operation electrical power flows from the adjustable voltage direct current load (motor) to the constant magnitude direct current voltage source (battery), rather than from the later to the former. Regenerative operation may be accomplished by maintaining the direction of current flow constant while reversing the voltage polarity or by reversing the direction of current flow while maintaining the polarity of the voltage. Conventional DC to DC conversion circuitry will not suffice for regenerative operation due to the inability of such circuitry to transmit power in both directions.

SUMMARY OF THE PRESENT INVENTION

It is, therefore, the object of the present invention to provide chopper circuitry capable of regenerative operation by maintaining the current flow direction constant while reversing the polarity of the voltage.

It is a further object of the present invention to provide such circuitry which is simple in construction and operation and which is capable of substantially trouble-free operation for substantial periods of time.

Briefly, the present invention provides a chopper in the general form of a bridge circuit having a pair of input terminals and a pair of output terminals connected to each other by bridge arm conductors. A constant magnitude DC voltage means is connected to the input terminals and the output terminals provide the adjustable magnitude direct current voltage. A pair of current flow control means, such as transistors or thyristors, are connected in opposite bridge arms and a pair of unidirectional current flow devices, such as diodes, are connected in the remaining two bridge arms. A control circuit is provided for controlling the current flow controlling state of the current flow control means for controlling the period of current conduction of the two current flow control means and the adjustable magnitude of the direct current output voltage. A control circuit also provides control over the polarity of the adjustable direct current voltage, thus permitting regenerative operation.

BRIEF DESCRIPTION OF THE DRAWING

FIG. 6 is a schematic diagram showing a modification of the regenerative chopper shown in FIG. 1.

FIGS. 7A and B are schematic diagrams showing other modifications of the regenerative chopper shown in FIG. 1.

DESCRIPTION OF THE PREFERRED EMBODIMENT

Figure 1:
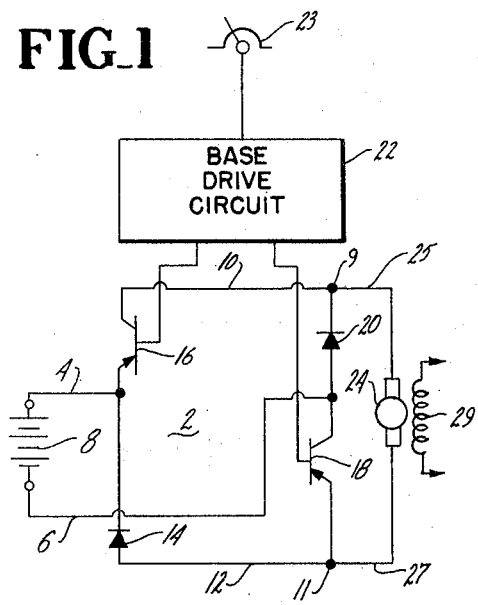
FIG. 1 is a schematic diagram of an embodiment of the regenerative chopper of the present invention.

Turning now to FIG. 1, there is shown therein, regenerative chopper 2 of the present invention. The means providing constant magnitude direct current voltage is diagrammatically shown as the positive and negative DC mains 4 and 6 supplied by battery 8.

Chopper 2 includes two series connected current flow control means and unidirectional current flow devices connected between output conductors 10 and 12. As shown in FIG. 1, the current control means may typically comprise transistors while the unidirectional current flow devices comprise diodes. In the construction of chopper 2, the anode of diode 14 is connected to the emitter-collector circuit of transistor 16 which, in turn, is connected to conductor 10. The emitter-collector circuit of transistor 18 is connected to conductor 12 and to the anode of diode 20, the cathode of which is connected to conductor 10. The base terminals of transistors 16 and 18 are connected to base drive circuit 22 which controls the turn on and turn off of transistors 16 and 18 in accordance with potentiometer 23. Positive direct current main 4 is connected intermediate diode 14 and transistor 16 and negative direct current main 6 is connected intermediate transistor 18 and diode 20 to that the configuration of chopper 2 is essentially that of bridge circuit having bridge arm conductors connected between the input terminals 5 and 7 and the output terminals 9 and 11 thereof. Load 24 is connected across output terminals 9 and 11 by load conductors 25 and 27. Load 24 is shown as the armature of a direct current motor having field winding 29. The motor may operate both as a motor and as a generator, as noted, infra.

Figure 2:
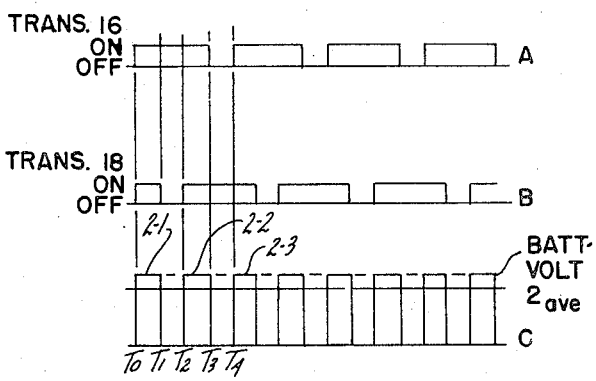
FIGS. 2, 3, 4, and 5 are graphs showing voltage wave forms produced during the operation of the circuitry of FIG. 1.

The operation of chopper 2 in regulating the average value of the adjustable magnitude direct current voltage output level will now be described in connection with FIGS. 2, 3, and 4. The graphs of FIG. 2A, 2B, and 2C, respectively show the on-off states of transistors 16 and 18, and the direct current voltage output of chopper 2, including the adjustable magnitude average output voltage level produced by the operation of chopper 2. In FIGS. 2A and 2B, it may be initially assumed that transistors 16 and 18 are both on, providing chopper out-out voltage 2-1. The current path through chopper 2 is from battery 8 through transistor 16, and conductor 10, conductor 25, to load 24, and from conductor 27 and conductor 12 through transistor 18 back to battery 8. These conditions exist at time $T_0$. At time $T_1$, transistor 18 is turned off. This removes battery 8 from the circuit and terminates voltage supply 2-1. The load current flows from conductor 12 through diode 14, transistor 16, directly to conductor 10, bypassing battery 8 and reducing the output voltage of the chopper to zero.

At time $T_2$, transistor 18 is turned on and the supply of voltage resumes, as by output voltage 2-2. Current flows in the path described above. At time $T_3$, transistor 16 is turned off, switching battery 8 out of the circuit and terminating output voltage 2-2. The load current then flows from conductor 12 through transistor 18 and diode 20 directly to conductor 10. At time $T_4$, transistor 16 is turned back on and voltage 2-3 appears at the output of chopper 2. The above operation is continued to supply positive average direct current voltage output level $2_{ave}$ to load 24.

The magnitude of the average output voltage level of chopper 2 is determined by the conductive intervals of transistors 16 and 18, and more specifically by the time intervals during which transistors 16 and 18 are simultaneously on. The shorter the period of simultaneous conduction of transistors 16 and 18, the lower the average output voltage level. The graphs of FIG. 3 show the operation of chopper 2 for zero output voltage conditions in which there are no periods of simultaneous conduction.

During regenerative operation it is necessary to reverse the voltage polarity of chopper 2. This is accomplished by turning transistors 16 and 18 simultaneously off for all, or a portion of the time. With transistors 16 and 18 both off, the load current in conductor 12 flows through diode 14, battery 8 as an electrical load, diode 20, to conductor 10, reversing the chopper voltage and providing the desired regenerative action. This regenerative action may be relieved to any desired extent by turning on transistors 16 and 18 to remove battery 8 from the path of current flow, as shown in FIG. 4, in which the graphs of FIGS. 4A, B, and C correspond, in general, to FIGS. 2A, B, and C. The negative polarity of the average adjustable magnitude direct current voltage output produced by negative voltages 4-1, 4-2, 4-3, etc. is shown in FIG. 4C as minus $2_{ave}$.

Adjustable voltage control may also be provided by periodically alternating the polarity of the output voltage of chopper 2. The relative magnitudes of the time periods of each voltage polarity determines the polarity and magnitude of the output voltage level of chopper 2. In this mode of operation, transistors 16 and 18 are turned on and off simultaneously for predetermined time intervals.

When base drive circuit 22 turns on both transistors 16 and 18 simultaneously for predetermined time intervals a direct current path is provided from battery 8 as an electrical source, through transistor 16 to conductor 10 and load 24, and from conductor 12 through transistor 18 back to battery 8. When transistors 16 and 18 are off, a path for the current of load 24 exists from conductor 12 through diode 14, battery 8 as an electrical load, diode 20, conductor 10 and load 24, as an electrical source. The polarity of the output voltage of chopper 2 reverses, which under conditions of constant current flow direction produces regenerative operation.

Figure 5:
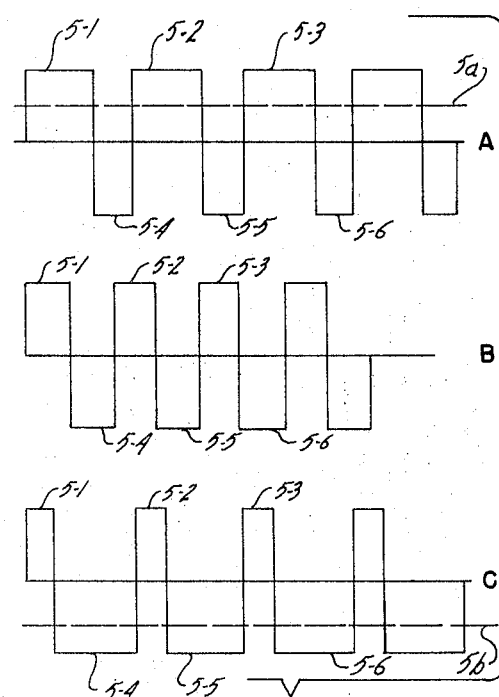

FIG. 5 shows in graphic form, the operation of chopper 2 in providing an adjustable magnitude direct current voltage level through simultaneous operation of transistors 16 and 18. In FIG. 5A, the on time of transistors 16 and 18, indicated by the numerals 5-1, 5-2, 5-3, etc., and during which positive battery 8 voltage is supplied, is long compared to the off time 5-4, 5-5, 5-6, etc., during which negative battery 8 voltage is supplied and the average direct current voltage level $5a$ produced by chopper 2 is positive. The on time of transistors 16 and 18 is controlled by base drive circuit 22 and potentiometer 23.

In FIG. 5B, the on periods 5-1, 5-2, 5-3, etc., of transistors 16 and 18 are equal to the off periods 5-4, 5-5, 5-6, etc., and the adjustable magnitude direct current voltage output level of chopper 2 is zero. In FIG. 5C, the on periods 5-1, 5-2, 5-3, etc., of transistors 16 and 18 are short compared to the off periods 5-4, 5-5, 5-6, etc., and the average value of the voltage level $5c$ of chopper 2 is negative.

Figure 3:
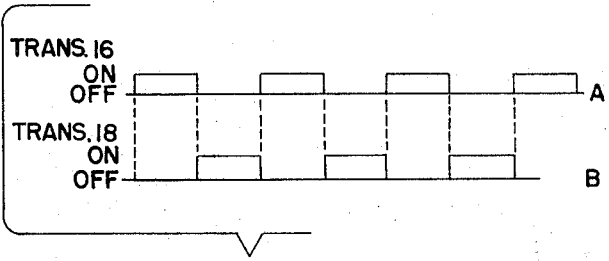
Figure 4:
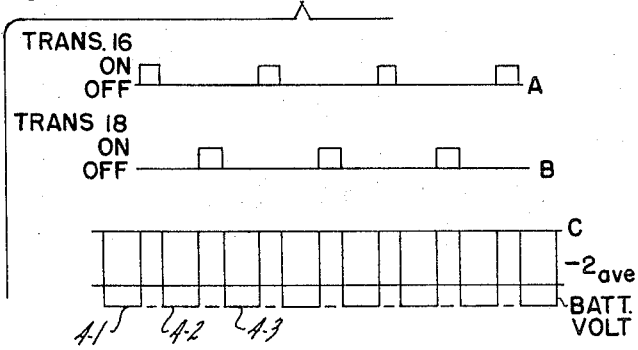

While the operation of chopper 2 described in FIG. 5 is simpler than that described in FIGS. 2, 3, and 4 the application of both positive and negative voltages and the usually lower frequency of operation increases the ripple content of the output voltage and impedes to some extent the establishment and maintenance of the adjustable magnitude direct current voltage output.

FIG. 6 shows a modification of the chopper shown in FIG. 1 in which the transistors have been replaced by thyristors 28 and 30, such as silicon controlled recitifiers (SCRs). The gate terminals of thyristors 28 and 30 are connected to firing circuit 32 for turning the thyristors on in accordance with the control signal generated by potentiometer 23.

Since no reverse voltages are available in chopper 2A of FIG. 6 for naturally commutating thyristors 28 and 30 off, turn off circuitry must be provided in chopper 2. Such circuitry may comprise series connected thyristors 34, inductor 36, and capacitor 38 connected in parallel with each of thyristors 28 and 30. Thyristors 34 are shunted by diodes 40. The gate terminals of thyristors 34 are connected to firing circuit 42 which controls the firing, or turn on, of transistors 34 in accordance with the signal generated at potentiometer 23. When one of thyristors 34 is turned on, the thyristor 38 or 40 associated therewith is reversed biased by the change on capacitor 38 and is turned off. The operation of chopper 2 containing thyristors 38 and 40 is similar to that with transistors 16 and 18.

Another embodiment of the regenerative chopper 2 of the present invention is shown in FIGS. 7A and 7B. This embodiment lends further economies to chopper 2 by replacing one of the more expensive current flow control means, such as the transistors of FIG. 1 or the thyristors of FIG. 2, with a less expensive current flow control means, such as a relay.

In chopper 2B of FIG. 7A, transistor 18 has been replaced by the normally open relay contacts 42a of relay 42. The coil 42b for relay contacts 42a is connected in conductor 44 in series with switch 46 and power supply 48. Chopper 2B is typically shown as energizing inductive load 50.

In power supplying operation, switch 46 is closed energizing relay coil 42b and closing relay contacts 42a. Transistor 16 is rendered periodically conductive by base drive circuit 22 to provide a positive adjustable magnitude direct current voltage output. During the on time of transistor 16, current flows from battery 8 through transistor 16 to conductor 10 and load 50, and from conductor 12 through closed relay contacts 42a back to battery 8. During the off time of transistor 16, battery 8 is removed from the circuit and current passes from conductor 12 through closed relay contacts 42a, diode 20, conductor 10, and load 50, back to conductor 12. The magnitude of the voltage output in conductors 10 and 12 is determined by relative magnitudes of the on and off periods of transistor 16.

When regenerative operation is desired, switch 46 is opened, opening relay contacts 42a. A path for the inductive current of load 24 exists from conductor 12 through diode 14, battery 8 as an electrical load, diode 20, conductor 10, and load 50, as an electrical source. The regenerative operation may be relieved to any desired extent by turning on transistor 16 and removing battery 8 from the circuit. Under typical voltage controlling operation, switch 46 may operate on a threshold basis from base drive circuit 22 so that voltage control is initially maintained by base drive circuit 22 and the on-off condition of transistor 16. In the event this control is inusfficient and the output voltage condition of chopper 2B gets out of range, switch 46 is opened to provide negative battery 8 voltage at the output of chopper 2B to rapidly restore voltage control. A voltage level sensing circuit may be coupled to the output terminals of chopper 2B to provide a voltage feedback to base drive circuit 22.

In instances in which a reversal of the polarity of the voltage of the load may precede the initiation of regenerative operation of the chopper, a circuit such as is shown in FIG. 7B may be employed. This operation may occur in the case in which the current flow direction in motor field winding 29 is reversible so as to reverse the voltage polarity of motor armature 24. In chopper 2C of FIG. 7B a voltage responsive relay 52 is utilized. Normally closed relay contacts 52a are inserted in series with diode 20. The coil 52b for relay contacts 52a is connected in series in conductor 54 with current limiting resistor 56 and diode 58. Diode 58 is poled to conduct current in conductor 54 when the voltage in conductor 12 is positive and the voltage in conductor 10 is negative, thereby rendering relay 52 responsive to the voltage polarity across motor armature 24.

In power supplying operation, transistor 16 is rendered periodically conductive by base drive circuit 22 and current flows from battery 8 through transistor 16 to conductor 10, and motor armature 24, and from conductor 12 through normally closed relay contacts 52a back to battery 8. The magnitude of the voltage output in conductors 10 and 12 is determined by the relative magnitude of the on and off periods of transistor 16.

Regenerative operation may be brought on by reversing the direction of current flow in motor field winding 29. This reverses the polarity of the voltage across motor armature 24 so that conductor 12 is of a positive polarity and conductor 10 is of a negative polarity. The voltage polarity of conductors 10 and 12 is such as to cause diode 58 to conduct, energizing relay coil 52b and opening relay contacts 52a. A path for the current of armature 24 exists from conductor 12 through diode 14, battery 8 as an electrical load, diode 20, conductor 10 and armature 24 as an electrical source or generator. The regenerative operation may be relieved to any desired extent by turning on transistor 16 and removing battery 8 from the circuit.

While, it might be possible to also utilize a relay in place of transistor 16, in the embodiment of FIGS. 7A and B, the frequency of operation of the current flow control means necessary for voltage control may preclude such a substitution.

Various modes of carrying out the invention are contemplated as being within the scope of the following claims particularly pointing out and distinctly claiming the subject matter which is regarded as the invention.

I claim:

1. A circuit having input terminals connectable to means providing constant magnitude direct current voltage and output terminals providing adjustable magnitude direct current voltage, said circuit comprising;
   a bridge circuit having a pair of said input terminals and a pair of said output terminals, each of said input terminals being connected to each of said output terminals by bridge arm conductors;
   a pair of current flow control means connected in two opposite bridge arm conductors for establishing a current path in said circuit including said means pro-viding constant magnitude direct current voltage as an electrical source, at least having relay contacts interposed in one of the opposite bridge arm conductors one of said pair of current control means comprising a relay;
   a pair of unidirectional current flow devices connected in the remaining two bridge conductor arms and poled for establishing a current path in said circuit including said means providing constant magnitude direct current voltage as an electrical load; and
   control circuitry including polarity detection means coupled to said output terminals and to said relay for operating said relay in accordance with the voltage impressed on said output terminals for establishing the current flow controlling state of said current control means for controlling the periods in which said current control means are simultaneously in the same current flow controlling state and the magnitude and polarity of the adjustable magnitude direct current voltage.

2. The circuit according to claim 1 wherein one said current flow control means comprises a transistor and said unidirectional current flow devices comprise diodes.

3. The circuit according to claim 1 wherein said control circuitry includes voltage level sensing means coupled to said output terminals, said control circuitry initially placing said relay in the current flow state and subsequently placing said relay in the current blocking state after a predetermined output voltage level has been exceeded, said control circuitry further regulating the current flow controlling state of said other current flow control means.

* * * * *